US012600320B2

(12) United States Patent
Alberga et al.

(10) Patent No.: US 12,600,320 B2
(45) Date of Patent: Apr. 14, 2026

(54) VEHICLE ANTI-THEFT DEVICE AND METHOD THEREFOR

(71) Applicants: Tony Alberga, Toronto (CA); Howard B. Katz, Boca Raton, FL (US); Roman Gold, Toronto (CA)

(72) Inventors: Tony Alberga, Toronto (CA); Howard B. Katz, Boca Raton, FL (US); Roman Gold, Toronto (CA)

(73) Assignee: Keyfree Technologies Inc., Etobicoke (CA)

( * ) Notice: Subject to any disclaimer, the term of this patent is extended or adjusted under 35 U.S.C. 154(b) by 92 days.

(21) Appl. No.: 18/650,529

(22) Filed: Apr. 30, 2024

(65) Prior Publication Data
US 2024/0399996 A1     Dec. 5, 2024

Related U.S. Application Data

(63) Continuation-in-part of application No. 18/204,155, filed on May 31, 2023, now Pat. No. 11,999,230.

(51) Int. Cl.
| | |
|---|---|
| *B60R 25/04* | (2013.01) |
| *B60R 25/045* | (2013.01) |
| *B60R 25/23* | (2013.01) |
| *B60R 25/24* | (2013.01) |
| *B60R 25/32* | (2013.01) |
| *B60R 25/33* | (2013.01) |

(52) U.S. Cl.
CPC ............ *B60R 25/04* (2013.01); *B60R 25/045* (2013.01); *B60R 25/23* (2013.01); *B60R 25/241* (2013.01); *B60R 25/32* (2013.01); *B60R 25/33* (2013.01)

(58) Field of Classification Search
CPC ....... B60R 25/00; B60R 25/04; B60R 25/045; B60R 25/102; B60R 25/20; B60R 25/209; B60R 25/24; B60R 25/241; B60R 25/32; B60R 25/33; B60R 25/34; B60K 28/00; B60K 28/06; G08B 21/24; G08B 25/10; G07C 5/00; G07C 5/008; G07C 5/08; H04W 12/00; H04W 12/04
See application file for complete search history.

(56) References Cited

U.S. PATENT DOCUMENTS

| | | | |
|---|---|---|---|
| 2017/0039784 A1 * | 2/2017 | Gelbart | G07C 5/00 |
| 2017/0101006 A1 * | 4/2017 | DeVries | A61B 5/4845 |
| 2018/0326947 A1 * | 11/2018 | Oesterling | B60R 25/241 |
| 2020/0344602 A1 * | 10/2020 | Li | H04L 67/125 |

* cited by examiner

*Primary Examiner* — Van T Trieu
(74) *Attorney, Agent, or Firm* — Weiss & Moy, PC; Jeffrey D. Moy

(57) ABSTRACT

A vehicle anti-theft device for a vehicle has a hardware adapter removably attached to an OnBoard Diagnostic II (OBD-II) port of the vehicle. The hardware adapter monitors for unauthorized movement of the vehicle and allows only authorized individuals who enter an authorization code to the hardware adapter to drive the vehicle.

19 Claims, 4 Drawing Sheets

VEHICLE ANTI-THEFT DEVICE AND METHOD THEREFOR

RELATED APPLICATIONS

This patent application is a Continuation-In-Part of U.S. patent application Ser. No. 18/204,155, filed May 31, 2023, entitled "VEHICLE ANTI-THEFT DEVICE AND METHOD THEREFOR", in the names of Tony Alberga, Roman Gold, and Howard Katz, which is further related to U.S. Provisional Application No. 63/353,809 filed Jun. 20, 2022, entitled "VEHICLE ANTI-THEFT DEVICE", in the names of Howard Katz and Roman Gold and is also related to U.S. Provisional Application No. 63/438,568 filed Jan. 12, 2023, entitled "VEHICLE ANTI-THEFT DEVICE", in the names of Tony Alberga, Howard Katz and Roman Gold both of which are incorporated herein by reference in its entirety.

TECHNICAL FIELD

The present application in general relates to security systems, and more specifically, to a vehicle anti-theft device that is easy to install and is able to immobilize the vehicle should an unauthorized individual try to drive the vehicle.

BACKGROUND

In 2020, there were over 880,000 vehicle thefts in the USA. In 2021, one study approximated that there were 268 stolen vehicle cases for every 100,000 people. That equates to over 932,000 vehicle thefts in 2021. A recent article in Forbes Magazine estimated that a vehicle is stolen every 36 seconds on average.

According to the National Insurance Crime Bureau (NICB), automobile theft statistics continue to rise because used car values are higher than normal rates. The used car value rates have increased by 35%, largely because of the COVID pandemic. It not only affects us at home but also has a tremendous impact on companies all over the world, including car production companies. There is also a considerable cost to the government to cover policing costs, legal and court costs, and health costs for the injured as a result of thefts.

Due to the COVID pandemic, there was a global shortage of semiconductors and the chips used to program semiconductors. Because of this, many automotive suppliers could not meet the new car demand. As a result, many dealerships across the country were left with their lowest reported inventory levels. Because of the low inventory, the used car value rates increased. And this has only increased the automobile theft statistics.

In the past, in order to prevent vehicle theft, many individuals installed vehicle alarm systems. Installing a vehicle alarm system generally required the user to take their vehicle to a vehicle alarm installation company where the vehicle alarm system would be hardwired into the vehicle. This may include sensors being hardwired to the doors, trunk, hood as well as other areas to monitor unauthorized entry or movement of the vehicle. These sensors generally monitor and detect unauthorized entry or movement of the vehicle and initiate an audible siren if unauthorized entry or movement was detected. Although audible alarms can be a deterrent, they are generally not effective in preventing vehicle theft. Since car alarm systems are in common use, most individuals often ignore them when they are activated.

Further, car alarms do not function to prevent a thief from gaining access to the vehicle and hot-wiring the ignition switch.

Presently, more sophisticated vehicle anti-theft systems have been developed which may be electronic in nature. These systems may disable the vehicle so that the vehicle will not start if the system detects unauthorized entry or movement of the vehicle. Unfortunately, these systems need to be hardwired into the vehicle which may be expensive and time consuming to install after market.

Therefore, it would be desirable to provide a system and method that overcomes the above. The system and method would provide a vehicle anti-theft device which may be installed manually into an On-Board Diagnostic (OBD) II port of a vehicle to be protected.

SUMMARY

In accordance with one embodiment, a vehicle anti-theft device for a vehicle is disclosed. The vehicle anti-theft device has a controller coupled to an ignition system of the vehicle. The controller has a communication module to wirelessly receive a signal to disable ignition of the vehicle when an individual wirelessly transmits the signal to disable ignition via a computing device.

In accordance with one embodiment, a vehicle anti-theft device for a vehicle is disclosed. The vehicle anti-theft device has a hardware adapter removably attached to an OnBoard Diagnostic II (OBD-II) port of the vehicle. The hardware adapter monitors for unauthorized movement of the vehicle and allows only authorized individuals who enter an authorization code to the hardware adapter to drive the vehicle. The hardware adapter wirelessly sends a signal to disable ignition when unauthorized movement of the vehicle is detected or when an improper authorization code is received. A controller is coupled to an ignition system of the vehicle. The controller has a communication module to wirelessly receive a signal to disable ignition of the vehicle when an individual wirelessly transmits the signal to disable ignition via a computing device or when the hardware adapter sends signals to disable ignition when unauthorized movement of the vehicle is detected or when an improper authorization code is received. A key frequency operated button (FOB) device is paired with the hardware adapter transmitting the authorization code to the hardware adapter.

In accordance with one embodiment, a vehicle anti-theft device for a vehicle is disclosed. The vehicle anti-theft device has a hardware adapter removably attached to an OnBoard Diagnostic II (OBD-II) port of the vehicle. The hardware adapter monitors for unauthorized movement of the vehicle and allows only authorized individuals who enter an authorization code to the hardware adapter to drive the vehicle. The hardware adapter wirelessly sends a signal to disable ignition when unauthorized movement of the vehicle is detected or when an improper authorization code is received. A controller is coupled to an ignition system of the vehicle. The controller has a communication module to wirelessly receive a signal to disable ignition of the vehicle when an individual wirelessly transmits the signal to disable ignition via a computing device or when the hardware adapter sends signals to disable ignition when unauthorized movement of the vehicle is detected or when an improper authorization code is received. A key frequency operated button (FOB) device is paired with the hardware adapter transmitting the authorization code to the hardware adapter. A tracker is attached to the key FOB identifying a current location of the key FOB. The hardware adapter communicates with a home alarm system of an owner of the vehicle. The alarm system wirelessly transmits signals to activate and disable the hardware adapter and disable ignition of the vehicle.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method relate to a vehicle anti-theft device and system. The vehicle anti-theft device and system uses a hardware adapter which connects manually to an OBD II port of a vehicle to be protected. The hardware adapter will contain all the hardware which will cause an audible alarm if the vehicle is touched, provides authentication by an owner of the vehicle to approved drivers of the vehicle, and will immobilize the vehicle if an unauthorized attempt is made to start and drive the vehicle. The hardware adapter will provide other security features as will be disclosed below.

Figure 1:
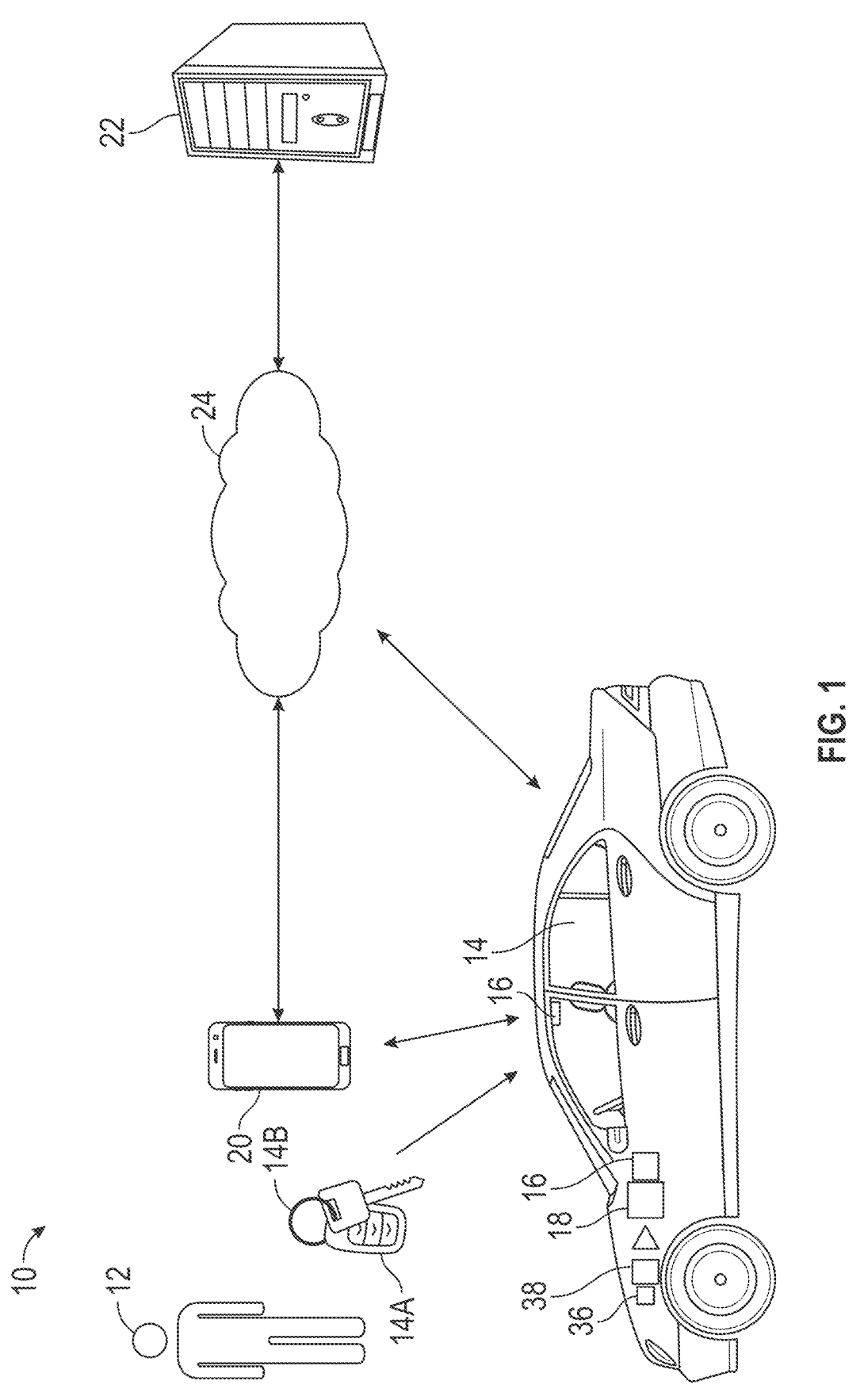
FIG. 1 is a block diagram of an exemplary vehicle anti-theft system in accordance with one aspect of the present application.
Figure 2:
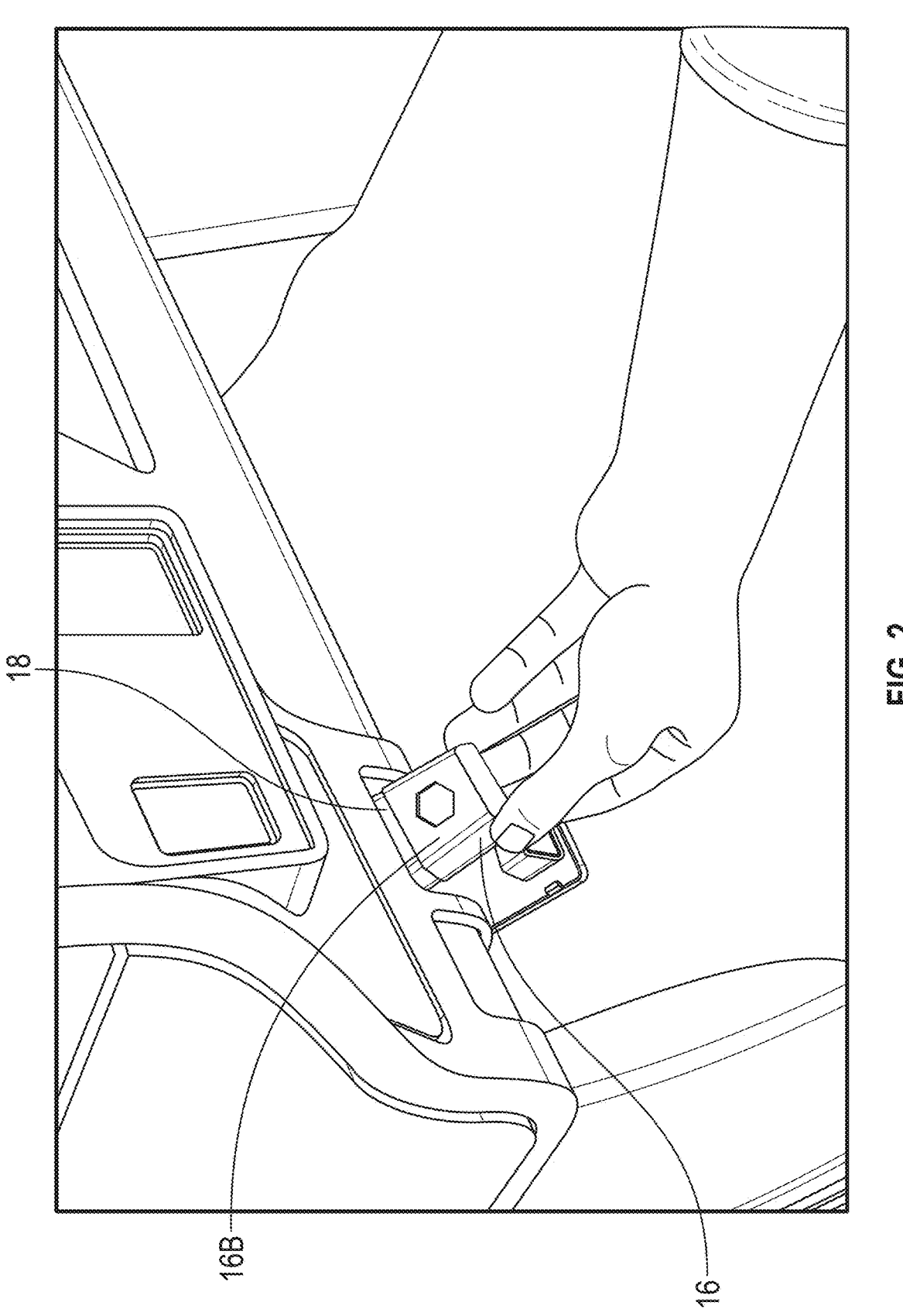
FIG. 2 is an elevated perspective view of vehicle anti-theft module used in the vehicle anti-theft system of FIG. 1 which may be instead into an On-Board Diagnostic (OBD) II port of a vehicle to be protected according to one aspect of the present application.
Figure 3:
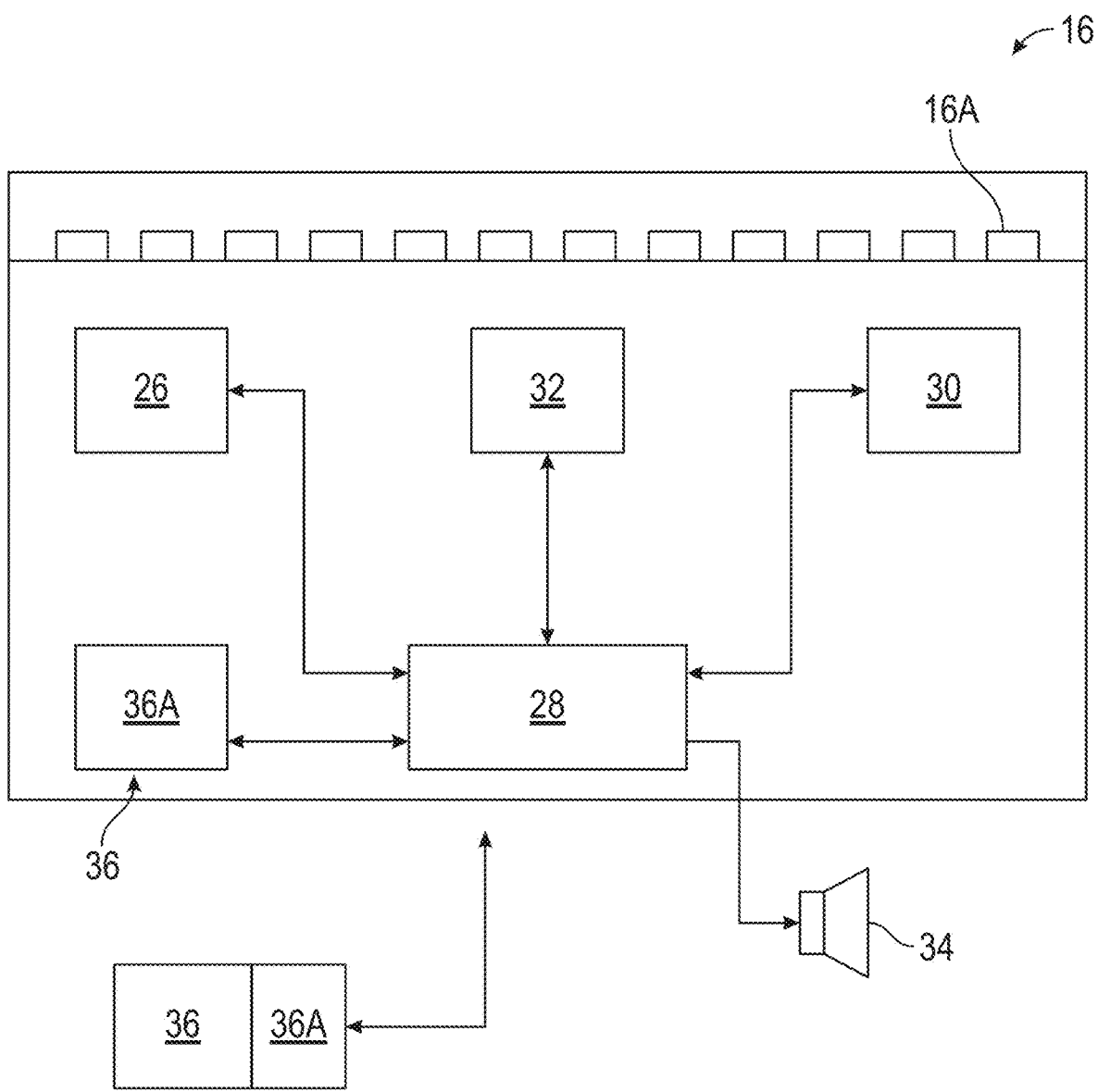
FIG. 3 is an exemplary functional block diagram of the vehicle anti-theft module of FIG. 2 according to one aspect of the present application.
Figure 4:
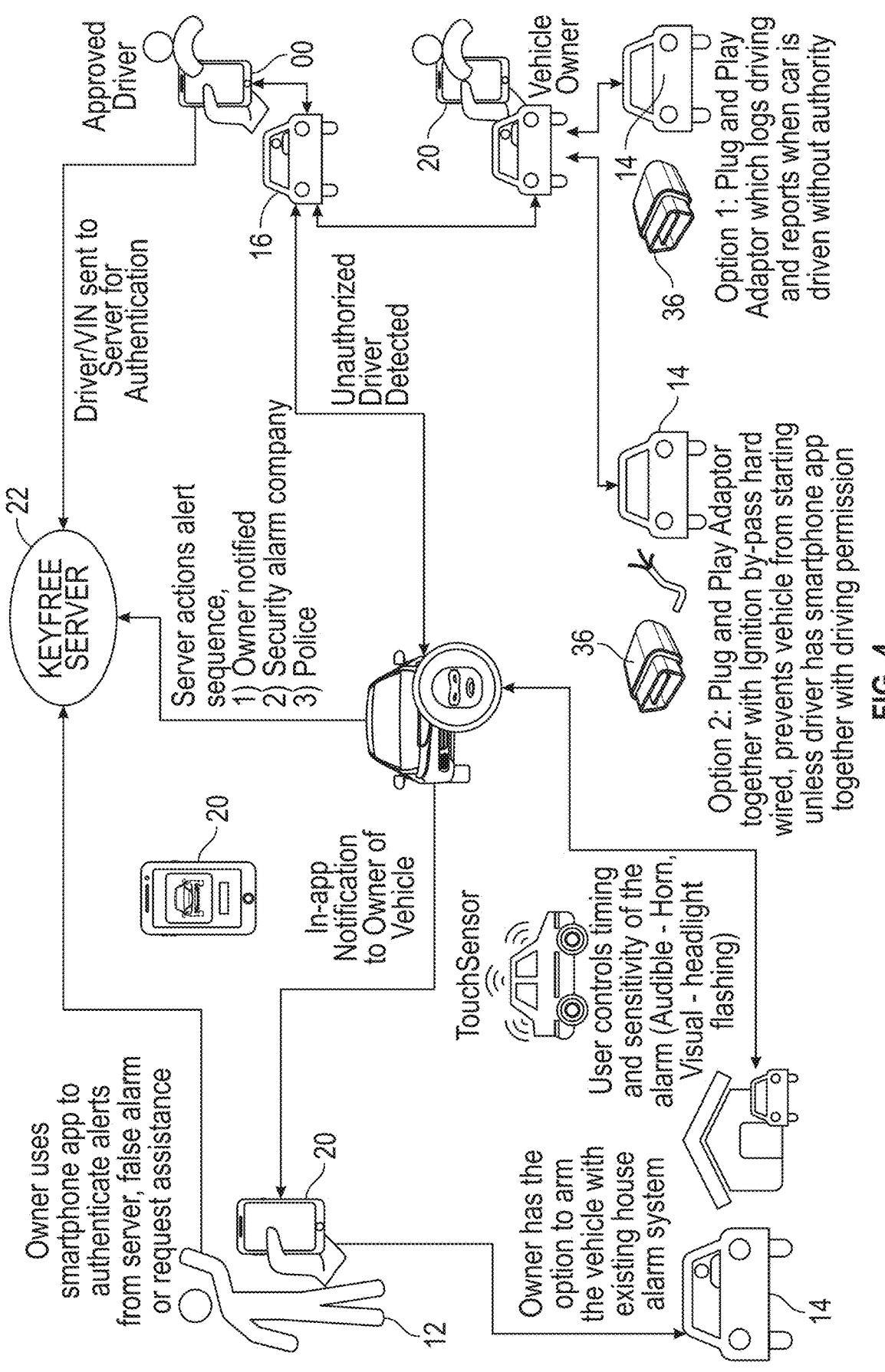
FIG. 4 is a block diagram of an exemplary vehicle anti-theft system in accordance with one aspect of the present application.

Referring now to FIG. 1, a vehicle anti-theft system 10 (hereinafter system 10) may be seen. The system 10 may be used by any owner 12 of a vehicle 14 who may wish to prevent the unauthorized entry and/or movement of the vehicle 14. The system 10 may use a hardware adapter 16 which may be plugged into an OBD II port 18 of the vehicle 14. In general, no hardwiring of the hardware adapter 16 may be required. In accordance with one embodiment, the hardware adapter 16 may be manually coupled to the On-Board Diagnostic (OBD) II port 18 of the vehicle 14 to be protected. OBD II ports 18 generally exists in all vehicles 14 manufactured after 1996. Thus, any vehicle 14 bult after 1996 can easily install the system 10 with no hardwiring required.

The hardware adapter 16 may wirelessly communicate with a computing device 20. The computing device 20 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. In the present embodiment, the computing device 20 may be a smartphone. The hardware adapter 16 may wirelessly communicate with the smartphone via a mobile application loaded on the smartphone. Via the computing device 20, the owner 12 may receive notifications about unauthorized entry and/or movement of the vehicle 14 as well as control other security features as may be described below.

The computing device 20 may communicate with a server 22 by wirelessly sending data to and receiving data from the server 22. The server 22 may receive data from the hardware adapter 16 and send messages to the computing device 20. The computing device 20 may connect to a network 24. The network 24 may be a local area network (LAN), a general wide area network (WAN), wireless local area network (WLAN) and/or a public network. Once connected to the network 24, the computing device 20 may send and receive data from the server 22.

As stated above, the computing device 20 may be loaded with a mobile application. The mobile application may be used to communicate with and/or control functions of the hardware adapter 16 as may be discussed below. By connecting to the network 22, the computing device 20 may access and communicate with the hardware adapter 16 via the server 22. Alternatively, the computing device 20 may communicate directly with the hardware adapter 16. The computing device 20 may transmit data to and from the hardware adapter 16 using a Personal Area Network (PAN) using wireless technologies such as, but not limited to, ANT+, Bluetooth, IEEE 802.15 TG3, IEEE 802.15 TG4, or similar standards. The mobile application may be downloaded from the Apple store, Android store, Google store or similar websites, and downloaded to the vehicle owner's smartphone.

Referring now to FIGS. 1-4, the hardware adapter 16 may be removably connected to the OBD-II port 18. This may allow the hardware adapter 16 to be portable and allows the hardware adapter 16 to be installed on any vehicles 14. The hardware adapter 16 may have a multi-pin connector 16A which may be inserted into a pinout port of the OBD-II port 18. Presently, current OBD-II ports 18 may have 16 pinout ports with port 4 being battery ground and port 16 being battery positive.

In order to prevent non-owners of the vehicle 14 from removing the hardware adapter 16, a locking device 16A may be formed on the hardware adapter 16. Once the hardware adapter 16 is attached to the OBD-II port 18, the locking device 16A may be engaged to secure the hardware adapter 16 to the OBD-II port 18 and prevent unauthorized individuals from removing/disengaging the hardware adapter 16 from the OBD-II ports 18. The locking device 16B may be a key lock or similar device that may allow only authorized individuals to disengage the hardware adapter 16 from the OBD-II port 18. In accordance with embodiment, the owner 12 of the vehicle 14 may be notified if the hardware adapter 16 is removed as may be described below.

When the hardware adapter 16 is attached to the OBD-II port 18, the hardware adapter 16 may be registered with a specific Vehicle Identification Number (VIN) of the vehicle 14. In accordance with one embodiment, this may be done wirelessly via the exchange of data between the hardware adapter 16, the computing device 20 and the server 22.

The hardware adapter 16 may contain all the circuitry and firmware that is required to conduct the anti-theft and other functions. In accordance with one embodiment, the hardware adapter 16 may monitor for any vibrations of the vehicle 14 which may be caused by movement of the vehicle 14. The hardware adapter 16 may have a gyroscope 26. The gyroscope 26 is a motion sensor that may detect and measure the angular motion of the vehicle 14. The gyroscope 26 may measure the rate of rotation of the vehicle 14 around a particular axis: 1-axis, 2-axis, and 3-axis. In accordance with one embodiment, the gyroscope 26 may be a 6 axis gyroscope sensor which may monitor the three standard axis (yaw, pitch and roll) along with 3-axis accelerometer. Should the gyroscope 26 detect vibrations to the vehicle 16 above a predetermined level, the gyroscope 26 may send a signal to a microcontroller unit (MCU) 28 of the hardware adapter 16. The gyroscope 26 may be coupled to the MCU 28 through a digital serial interface. The MCU 28 may then send a notification to the owner 12. The notification may be sent via the server 22 to the computing device of the owner 12. The notification may be email, text, recorded telephone messages and/or other similar notification methods in real time.

The owner 12 may use the mobile application on the computing device 20 to set the sensitivity of the gyroscope 26. For example, the owner 12 may use the mobile application to set the sensitivity of the gyroscope 26 to monitor for any vibrational movement of the vehicle 16 (i.e., touch sensitive). Alternatively, the owner 12 may use the mobile application to set the sensitivity of the gyroscope 26 to be a little less sensitive so that the wind or accidental touching of the vehicle 14 will not cause a notification to be sent to the owner 12.

The gyroscope 26 may also measure the movement of the vehicle 14 when the vehicle 14 is running. Thus, the gyroscope 26 may monitor if the vehicle 14 may be driving erratically such as excessive swerving, speeding, hard breaking, or similar erratic behavior. the gyroscope 26 may send a signal to a microcontroller unit (MCU) 28 of the hardware adapter 16. In these situations, the gyroscope 26 may send these readings to the MCU 28 or a separate memory of the hardware adapter 16. The MCU 28 may then send a notification to the owner 12 in a similar manner as disclosed above.

The MCU 28 may also send a signal to sound an alarm when the gyroscope 26 detects unauthorized movement of the vehicle 14. The MCU 28 may send a signal to a horn 34 of the vehicle 14. In order to provide a loud and distinct alarm in the event that there is any unauthorized movement of the vehicle 14, the horn 34 may sound with a minimum sound level of 150 dB. The horn 34 may be the horn of the vehicle 14. Alternatively, the horn 34 may be a separate unit attached under the hood of the vehicle 14. This horn 34 should be placed in a discreet location so that it cannot be easily disconnected. The horn 34 may require to be connected to the battery system of the vehicle 14. The horn 34 may be wirelessly connected to the hardware adapter 16. The hardware adapter 16 may communicate with the horn 34 via Bluetooth or other short distance wireless standards.

In accordance with one embodiment, the mobile application on the computing device 20 may allow the owner 12 of the vehicle 14 to set a time duration setting of the horn 34 so that it can be controlled as required. The owner 12 may also use the mobile application to sound the horn 34 for a predetermined amount of time should the hardware adapter 16 be removed without first being properly unlocked. Thus, if the hardware adapter 16 is removed from the OBD-II port

18 by an unauthorized person, the horn 34 may be programmed to sound continuously for a period of time set within the mobile application.

In order to communicate with the server 22, the hardware adapter 16 may have a wireless transmitter/receiver 30. The wireless transmitter/receiver 30 may allow the wireless transmission of data to and from the hardware adapter 16. The receiver/transmitter 30 may be used to wirelessly transmit data to the computing device 20 in different manners. In accordance with one embodiment, the computing device 16 may download the data wirelessly using a local area network (LAN), a general wide area network (WAN), wireless local area network (WLAN), cellular network, and/or any public network. The data transmitted by the wireless transmitter/receiver 30 may be encrypted. Encryption may secure the data by encoding it mathematically through cryptography so that it can only be read, or decrypted, by those with the correct key or password. The wireless transmitter/receiver 30 may use symmetric or asymmetric encryption. In accordance with one embodiment, the hardware adapter 16 may use Advance Encryption Standard (AES) 256-bit encryption to provide security from hacking or cyber-attacks.

In accordance with one embodiment, the wireless transmitter/receiver 30 may be able to transmit and receive data via a satellite-based communication service. This may allow the system 10 to work in locations that do not have terrestrial services.

In accordance with one embodiment, the wireless transmitter/receiver 30 may receive Long-Term Evolution (LTE) data, 5G WiFi data, satellite data like Starlink™ or other providers, and similar wireless data signals to allow the hardware adapter 16 to provide internet access to a computing device 20 coupled to the hardware adapter 16. The computing device 20 may be a computing device 20 forming part of an infotainment system of the vehicle 14, a computing device 20 brought into the vehicle 14 such as a laptop, tablet, smartphone or the like. The above are given as examples and should not be seen in a limiting manner.

In accordance with one embodiment, the wireless transmitter/receiver 30 may be used to contact an emergency service. The hardware adapter 16 or an application on the computing device 20 may be designed to have an input button that when pressed may send a signal to an emergency service that the driver and/or passenger may be in need of help similar to a panic button. Alternatively, or in addition to, when the gyroscope 26 detects that the vehicle 14 may have been involved in an accident, the wireless transmitter/receiver 30 may be used to contact one or more emergency services. The hardware adapter 16 may indicate a location of the vehicle 14 by using a Global Positioning System (GPS) unit 32 disclosed below.

To use the vehicle anti-theft device to automatically communicate with an emergency service in the event of a serious accident, and to provide the location the vehicle to the emergency service If the gyroscope 26 does detect unauthorized movement of the vehicle 14, the hardware adapter 16 may indicate a location of the vehicle 14. In accordance with one embodiment, a Global Positioning System (GPS) unit 32 may be coupled to the MCU 28. The GPS unit 32 may be a navigation unit of the vehicle 14. Alternatively, the GPS unit 32 may just be a tracking unit. The GPS unit 32 may be used to monitor a current location of the vehicle 14. When the MCU 28 detects unauthorized movement of the vehicle 14, the MCU 28 may record a time/date of the movement, as well as a current location of the vehicle 14. This information may then be transmitted to the computing device 20 via the receiver/transmitter 30.

The MCU 28 may be programed with a Vehicle Identification Number (VIN) authentication function. The VIN authentication function may allow the owner 12 of the vehicle 14 to only authorize certain people to drive the vehicle 14. The VIN authentication function may be controlled through the computing device 20. In accordance with one embodiment, the VIN authentication function may be controlled through the use of the mobile application of the computing device. The VIN authentication function may be activated through the mobile application. When activated, the owner 12 of the vehicle 14 can provide as many other individuals to be approved drivers of the vehicle 14 as the owner 12 chooses. Approved drivers may be able to download onto their smartphone an authentication code that may allow the authorized driver to start and drive the vehicle 14. VIN Authentication function ties the VIN of the vehicle 14 to the hardware adapter 16 and to the approved drivers. Without the VIN Authentication, any unauthorized attempt to start and drive the vehicle 14 may cause the horn 34 to sound and pre-programmed SMS messages and phone calls may be sent to the owner 14, to the police and to any home security company (if available).

In accordance with one embodiment, when the VIN authentication function may be activated, each authorized driver will receive an authentication code. When the authorized driver approaches the vehicle 14, the authentication code may be entered into the hardware adapter 16. For example, the authentication code may be wirelessly transmitted to the hardware adapter 16 via Bluetooth or other short range wireless transmission technology. Once the hardware adapter 16 verifies the authenticity of the authentication code, the authorized driver may be able to start the vehicle 14.

Alternatively, if an authorized driver forgot his/her computing device that downloaded the authentication code or if the computing device that downloaded the authentication code is disabled due to no power, the authorized driver may use a special sequence of knocks on the vehicle 14 to allow the authorized driver to start the vehicle 14. For example, the special sequence of knocks may be 3 knocks followed by a pause then say two knocks, followed by another pause followed by 3 knocks. This code would only be known to the owner and/or authorized driver and would be like the passcode on your smartphone. By entering this sequence, the hardware adapter 16 may disengage the VIN Authentication feature so that the authorized driver can enter the vehicle 14 and drive it. In accordance with one embodiment, the gyroscope 26 may be used to monitor for the sequence of knocks and to send a signal to the MCU 28 to disable the VIN Authentication feature when the knock sequence is recorded.

The MCU 28 may be programed with a "Vehicle Immobilization" function. The hardware adapter 16 may be coupled to a controller 36. The hardware adapter 16 may be coupled to the controller via wired or wireless means. In accordance with one embodiment, the controller 36 may be plugged into a fuse box 38 of the vehicle 14. The controller 36 may send a signal to the ignition switch to prevent the vehicle 14 from starting if there is an attempt to enter and start the vehicle 14 without having obtained proper VIN Authentication as disclosed above. If the hardware adapter 16 does not receive the proper VIN Authentication from a computing device 20, the hardware adapter 16 may send a signal to the controller 36 to prevent the vehicle 14 from starting. The hardware adapter 16 may further send the owner 12 a notification as discussed above about the potential unauthorized attempt to start the vehicle 14 and the horn 34 may sound an alarm.

In accordance with one embodiment, the controller 36 may be a relay connected to a starter of the vehicle 14. The relay may be connected to the starter through a starter fuse in a fuse box of the vehicle 14. The relay may be controllable via a Bluetooth Low Energy (BLE) chip that may receive instructions from the hardware adapter 16 to either start or disable the vehicle 14.

In accordance with the embodiment where the hardware adapter 16 may be wirelessly connected to the controller 36, the controller 36 may have a communication module 36A coupled thereto. The communication module 36A may be used to receive and/or transmit data to and from the hardware adapter 16. For example, the communication module 36A may be used just to receive the signal to the controller 36 to prevent the vehicle 14 from starting. Alternatively, the communication module 36A may be used to receive and transmit data to and from the hardware adapter 16. For example, the communication module 36A may be used to receive the signal to the controller 36 to prevent the vehicle 14 from starting and to transmit a signal back to the hardware adapter 16 that the vehicle 14 has been disabled from starting.

In accordance with one embodiment, the communication module 36A may be used to send a signal to the controller 36 to prevent the vehicle 14 from starting from the owner of the vehicle or an authorized third party, for example law enforcement. In this embodiment, the owner may want to prevent the vehicle 14 from starting in order to prevent all parties from starting the vehicle 14, for example when the owner is leaving for a vacation or when the owner will not be using the vehicle for an extended period of time. Alternatively, the police or other third party may want to send a signal to the controller 36 to prevent the vehicle 14 from starting such as when the police have pulled over the vehicle 14 and the suspect driving the vehicle 14 may have outstanding warrants, is a criminal suspect, is at a DUI checkpoint, as well as other similar situations.

In the embodiment where the controller 36 has the communication module 36A, the controller may be used as a separate unit to prevent the vehicle 14 from starting. The vehicle 14 may be an automobile (internal combustion or electric), an autonomous vehicle, All Terrain Vehicle (ATV), motorized boat/ship, motorcycle, motor scooters, snowmobiles, personal watercraft, golf carts, LSV (low speed vehicles), or other types of motorized vehicles. In this embodiment, the controller 36 may be connected to the starter either directly, through a starter fuse in a fuse box of the vehicle 14, or by other means. The owner 12 may use the mobile application on the computing device 20 to send a signal to the controller 36 to prevent the vehicle 14 from starting and being used without the owner's permission. The controller 36 may be powered by the battery of the vehicle 14 or by a separate battery of the controller 36.

In accordance with one embodiment, if there is an unauthorized attempt to remove the hardware adapter 16, the hardware adapter 16 may send a wireless signal to the controller 36. The controller 36 may then send a signal to the ignition switch to prevent the vehicle 14 from starting. The hardware adapter 16 may further send the owner 12 a notification as discussed above and the horn 34 may sound an alarm.

In accordance with one embodiment, the owner 12 may remotely send a signal via the mobile application to the controller 36. This may allow the owner 12 to disable the ignition of the vehicle 14 at any time. For example, if someone steals the vehicle 14 by towing it away, the owner 12 may disable the ignition so that no one may be able to start the vehicle 14. Alternatively, or in addition to, the owner 14 may receive information that an authorized person driving the vehicle 14 may be driving erratically. The owner 12 may then want to disable the ignition of the vehicle 14 once the vehicle 14 has stopped so that the authorized person can no longer start the vehicle 14. The above are given as examples and should not be seen in a limiting manner.

The hardware adapter 16 may have one or more smoke detecting sensors 36. Different types of technologies may be used for the smoke detecting sensor 36. In accordance with one embodiment, the smoke detecting sensor 36 may be a particle sensor 36A. The particle sensor 36A may be a high-precision particle concentration sensor based on Mie scattering theory. Mie scattering theory is a generalized solution that describes the scattering of an electromagnetic wave by a homogeneous spherical medium having refractive indexes (RIs) different from that of the medium through which the wave is traversing. The particle sensor 36A may support the continuous acquisition of data and calculates the number of suspended particles, different sizes of the particle in the air per unit volume and converts this data into an air quality concentration levels. In accordance with one embodiment, the particle sensor 36A can detect particle sizes from 0.1 μM to 10 μM. Tobacco and cannabis smoke particles are quantitatively similar in volatility, shape, density, and number concentration, albeit with differences in size, total mass, and chemical composition. By determining the size of the suspended particle, one may determine whether the smoke detected is tobacco or cannabis. Particles from cannabis smoke are on average 29% larger in mobility diameter than particles from tobacco smoke and contain 3.4× more total mass. Alternatively, the sensor 36 may be an electrochemical sensor. The electrochemical sensor may be designed to detect and distinguish between different chemical compounds in the smoke being detected. Thus, the data electrochemical sensor may be used to determine if the smoke detected contains tobacco or cannabis.

The sensor 36 may be coupled to the MCU 28. The sensor 36 may be coupled to the MCU 28 through a digital serial interface. The data monitored from the sensor 36 may be transferred in frames of 28 bytes plus framing and checksum bytes. The MCU 28 may monitor the data from the sensor 36 at predetermined timeframes. For example, the MCU 28 may monitor the data from the sensor 26 every 5 seconds. Using the data from the sensor 36, the MCU 28 may process the data using adjustable thresholds to determine if a recordable "smoke event" has occurred.

In accordance with one embodiment, if the hardware adapter 16 determines that an individual has been smoking within the vehicle 14, the hardware adapter 16 may send a signal to the controller 36 to disable the vehicle 14 and prevent the induvial from starting the vehicle 14. In accordance with one embodiment, if the hardware adapter 16 determines that an individual has been smoking cannabis within the vehicle 14, the hardware adapter 16 may send a signal to the controller 36 to disable the vehicle 14 and prevent the induvial from starting the vehicle 14 The hardware adapter 16 may be programmed to allow the owner of the vehicle 14 to determine the length of time the vehicle will be disabled. For example, the hardware adapter 16 may be programmed to permanently prevent the individual smoking within the vehicle from starting the vehicle 14 or may be programmed to prevent the individual smoking within the vehicle from starting the vehicle 14 for a predetermined timeframe, i.e., a day, a week, a month, etc. In this embodiment, the communication module 36A of the controller 36 may be used to receive the signal to the controller 36 to prevent the vehicle 14 from starting.

In accordance with one embodiment of the present invention, the hardware adapter 16 may be paired with a key fob 14A of the vehicle 14. The key fob 14A may be used to authenticate if the person is the authorized driver, to activate the hardware adapter 16, disable the ignition of the vehicle 14, or any of the other features described above. The key fob 14A may have a tracker 14B stored within the key fob 14A. The tracker 14B may allow the owner 12 to monitor the location of each key fob 14A registered to the vehicle 14.

In accordance with one embodiment of the present invention, the hardware adapter 16 may be paired with a home security system of the owner 12. In this embodiment, once the home security system is armed, the hardware adapter 16 may arm all anti-theft features as disclosed above that have been activated by the owner 12. In this embodiment, if the home security system is connected to a voice monitor system such as Apple Homekit, Google, or Amazon Alexa, one may vocally command the hardware adapter 16 to arm the anti-theft features. The owner of the vehicle 14 may give a command to activate the hardware adapter 16, disable the ignition of the vehicle 14, or any of the other features described above. Further, notifications may be sent through the voice monitor systems when the anti-theft feature sounds an alarm.

The foregoing description is illustrative of particular embodiments of the invention, but is not meant to be a limitation upon the practice thereof. The following claims, including all equivalents thereof, are intended to define the scope of the invention.

What is claimed is:

1. A vehicle anti-theft device for a vehicle, comprising:
a hardware adapter removably attached to an OnBoard Diagnostic II (OBD-II) port of the vehicle, the hardware adapter monitoring for unauthorized movement of the vehicle and allowing only authorized individuals who enter an authorization code to the hardware adapter to drive the vehicle;
a wireless computing device in wireless communication with the hardware adapter, wherein an owner of the vehicle authorizes a predetermined number of individuals as drivers, wherein only the predetermined number of individuals authorized are able to download authorization codes to allow the vehicle to be started, wherein one of the authorized individuals wirelessly receiving a corresponding authorization code on the wireless computing device, the wireless computing device wirelessly transmitting the corresponding authorization code to the hardware adapter, after verification of the authorization code by the hardware adapter, the one of the authorized individuals can start the vehicle;
a controller wirelessly coupled to the hardware adapter and coupled to an ignition system of the vehicle, the controller having a communication module,
wherein the communication module is configured to wirelessly receive a signal from the wireless computing device to disable ignition of the vehicle when an individual wirelessly transmits the signal to disable ignition via the wireless computing device,
wherein the communication module is configured to transmit a signal to the hardware adapter to disable ignition of the vehicle when an unauthorized code is entered, and wherein the hardware adapter is configured to wirelessly send signals to the controller to disable ignition when unauthorized movement of the vehicle is detected or when an improper authorization code is received.

2. The vehicle anti-theft device of claim 1, comprising a key frequency operated button (FOB) device paired with the hardware adapter transmitting the authorization code to the hardware adapter.

3. The vehicle anti-theft device of claim 1, comprising:
a key frequency operated button (FOB) device paired with the hardware adapter transmitting the authorization code to the hardware adapter; and
a tracker attached to the key FOB identifying a current location of the key FOB.

4. The vehicle anti-theft device of claim 1, wherein the hardware adapter communicates with a home alarm system of an owner of the vehicle to activate and disable the hardware adapter.

5. The vehicle anti-theft device of claim 1, wherein the hardware adapter communicates with a home alarm system of an owner of the vehicle, the alarm system wirelessly transmitting signals to activate and disable the hardware adapter and disable ignition of the vehicle.

6. The vehicle anti-theft device of claim 1, wherein the hardware adapter comprises:
at least one motion sensor, wherein the at least one motion sensor is a gyroscopic sensor;
a microcontroller unit (MCU) coupled to the at least one motion sensor determining when the at least one motion sensor detects unauthorized movement of the vehicle above a predetermined threshold level; and
a receiver and transmitter coupled to the MCU.

7. The vehicle anti-theft device of claim 6, wherein the receiver transmitter contacts emergency services when the at least one motion sensor senses that the vehicle has been involved in an emergency.

8. The vehicle anti-theft device of claim 6, comprising a smoke detection sensor coupled to the MCU, wherein the MCU wirelessly transmits the signal to disable ignition of the vehicle when the smoke detection sensor determines smoke above a predetermined threshold.

9. The vehicle anti-theft device of claim 1, comprising a locking device coupled to the hardware adapter preventing unauthorized removal of the hardware adapter from the OBD-II port, wherein the hardware adapter sending an alarm signal during an unauthorized removal of the hardware adapter from the OBD-II port.

10. The vehicle anti-theft device of claim 6, wherein the hardware adapter comprises a Global Positioning System (GPS) unit coupled to the MCU.

11. A vehicle anti-theft device for a vehicle, comprising:
a hardware adapter removably attached to an OnBoard Diagnostic II (OBD-II) port of the vehicle, the hardware adapter monitoring for unauthorized movement of the vehicle and allowing only authorized individuals who enter an authorization code to the hardware adapter to drive the vehicle;
a wireless computing device in wireless communication with the hardware adapter, wherein an owner of the vehicle authorizes a predetermined number of individuals as drivers, wherein only the predetermined number of individuals authorized are able to download authorization codes to allow the vehicle to be started, wherein one of the authorized individuals wirelessly receiving a corresponding authorization code on the wireless computing device, the wireless computing device wirelessly transmitting the corresponding authorization code to the hardware adapter, after verification of the authorization code by the hardware adapter, the one of the authorized individuals can start the vehicle;
a controller wirelessly coupled to the hardware adapter and coupled to an ignition system of the vehicle, the controller having a communication module,
wherein the communication module is configured to wirelessly receive a signal from the wireless computing device to disable ignition of the vehicle when an individual wirelessly transmits the signal to disable ignition via the wireless computing device,
wherein the communication module is configured to transmit a signal to the hardware adapter to disable ignition of the vehicle when an unauthorized code is entered,
and wherein the hardware adapter is configured to wirelessly send signals to the controller to disable ignition when unauthorized movement of the vehicle is detected or when an improper authorization code is received; and
a key frequency operated button (FOB) device paired with the hardware adapter transmitting the authorization code to the hardware adapter.

12. The vehicle anti-theft device of claim 11, comprising a tracker attached to the key FOB identifying a current location of the key FOB.

13. The vehicle anti-theft device of claim 11, wherein the hardware adapter communicates with a home alarm system of an owner of the vehicle, the alarm system wirelessly transmitting signals to activate and disable the hardware adapter and disable ignition of the vehicle.

14. The vehicle anti-theft device of claim 11, wherein the hardware adapter comprises:
at least one motion sensor, wherein the at least one motion sensor is a gyroscopic sensor;
a microcontroller unit (MCU) coupled to the at least one motion sensor determining when the at least one motion sensor detects unauthorized movement of the vehicle above a predetermined threshold level; and
a receiver and transmitter coupled to the MCU, wherein the receiver transmitter contacts emergency services when the at least one motion sensor senses that the vehicle has been involved in an emergency.

15. The vehicle anti-theft device of claim 14, comprising a smoke detection sensor coupled to the MCU, wherein the MCU wirelessly transmits the signal to disable ignition of the vehicle when the smoke detection sensor determines smoke above a predetermined threshold.

16. The vehicle anti-theft device of claim 11, comprising a locking device coupled to the hardware adapter preventing unauthorized removal of the hardware adapter from the OBD-II port, wherein the hardware adapter sending an alarm signal during an unauthorized removal of the hardware adapter from the OBD-II port.

17. The vehicle anti-theft device of claim 11, wherein the hardware adapter comprises a Global Positioning System (GPS) unit coupled to the MCU.

18. A vehicle anti-theft device for a vehicle, comprising:
a hardware adapter removably attached to an OnBoard Diagnostic II (OBD-II) port of the vehicle, the hardware adapter monitoring for unauthorized movement of the vehicle and allowing only authorized individuals who enter an authorization code to the hardware adapter to drive the vehicle;
a wireless computing device in wireless communication with the hardware adapter, wherein an owner of the vehicle authorizes a predetermined number of individuals as drivers, wherein only the predetermined number of individuals authorized are able to download authorization codes to allow the vehicle to be started, wherein one of the authorized individuals wirelessly receiving a corresponding authorization code on the wireless computing device, the wireless computing device wirelessly transmitting the corresponding authorization code to the hardware adapter, after verification of the authorization code by the hardware adapter, the one of the authorized individuals can start the vehicle;

a controller wirelessly coupled to the hardware adapter and coupled to an ignition system of the vehicle, the controller having a communication module, wherein the communication module is configured to wirelessly receive a signal from the wireless computing device to disable ignition of the vehicle when an individual wirelessly transmits the signal to disable ignition via the wireless computing device, wherein the communication module is configured to transmit a signal to the hardware adapter to disable ignition of the vehicle when an unauthorized code is entered, and wherein the hardware adapter is configured to wirelessly send signals to the controller to disable ignition when unauthorized movement of the vehicle is detected or when an improper authorization code is received;

a key frequency operated button (FOB) device paired with the hardware adapter transmitting the authorization code to the hardware adapter; and a tracker attached to the key FOB identifying a current location of the key FOB;

wherein the hardware adapter communicates with a home alarm system of an owner of the vehicle, the alarm system wirelessly transmitting signals to activate and disable the hardware adapter and disable ignition of the vehicle.

19. The vehicle anti-theft device of claim 18, wherein the hardware adapter comprises:

at least one motion sensor, wherein the at least one motion sensor is a gyroscopic sensor;

a microcontroller unit (MCU) coupled to the at least one motion sensor determining when the at least one motion sensor detects unauthorized movement of the vehicle above a predetermined threshold level;

a receiver and transmitter coupled to the MCU, wherein the receiver transmitter contacts emergency services when the at least one motion sensor senses that the vehicle has been involved in an emergency;

a smoke detection sensor coupled to the MCU, wherein the MCU wirelessly transmits the signal to disable ignition of the vehicle when the smoke detection sensor determines smoke above a predetermined threshold; and a Global Positioning System (GPS) unit coupled to the MCU.

* * * * *